Nov 24, 1953

E. R. KILGEN 2,660,628

MASTER OR CENTRAL STATION CONTROLLER

Original Filed April 9, 1951

INVENTOR.
EUGENE R. KILGEN
BY
ATTORNEYS

Nov 24, 1953  E. R. KILGEN  2,660,628
MASTER OR CENTRAL STATION CONTROLLER
Original Filed April 9, 1951  5 Sheets-Sheet 3
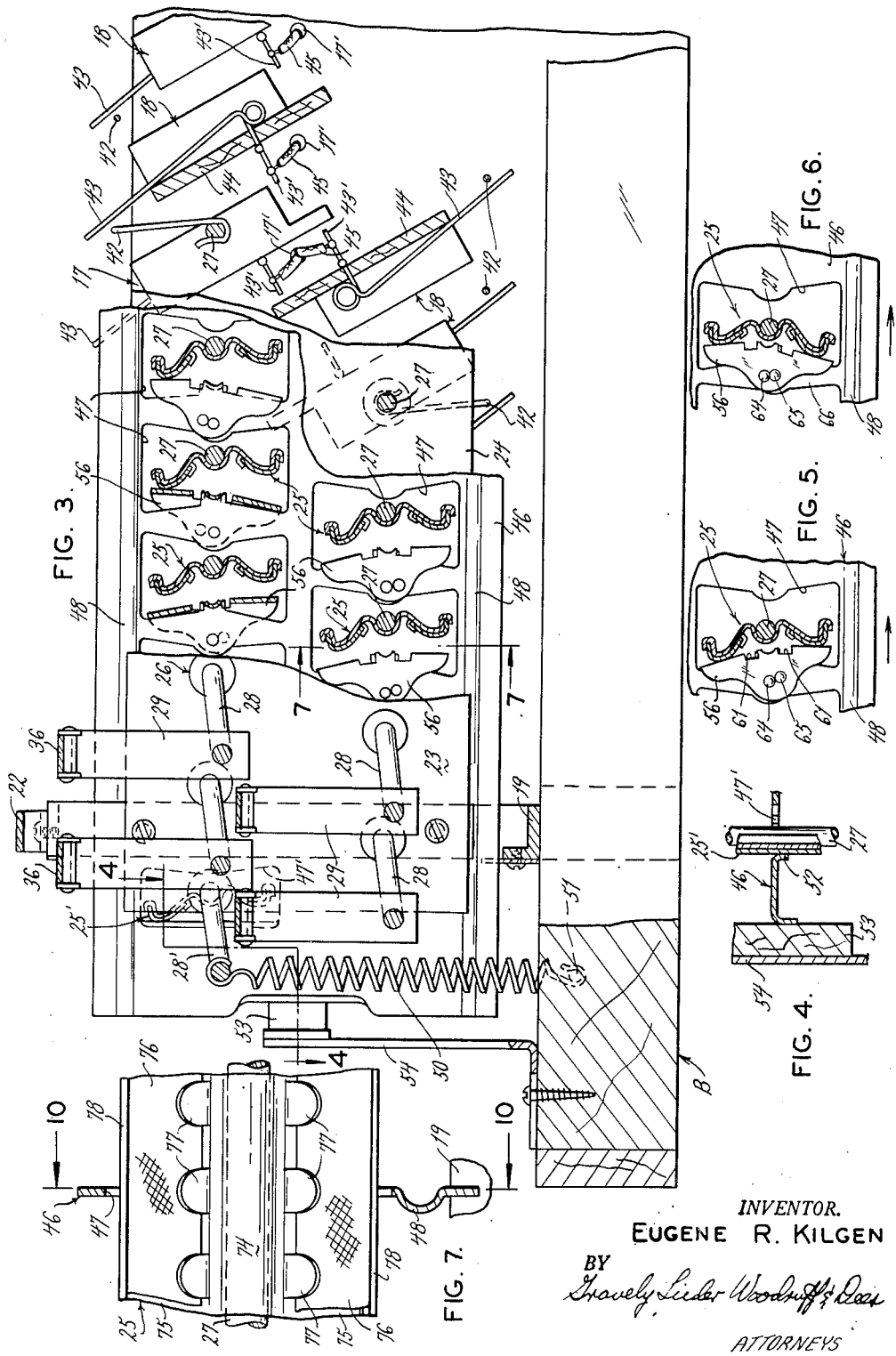
INVENTOR.
EUGENE R. KILGEN
BY
*Gravely Lieder Woodruff & Daer*
ATTORNEYS

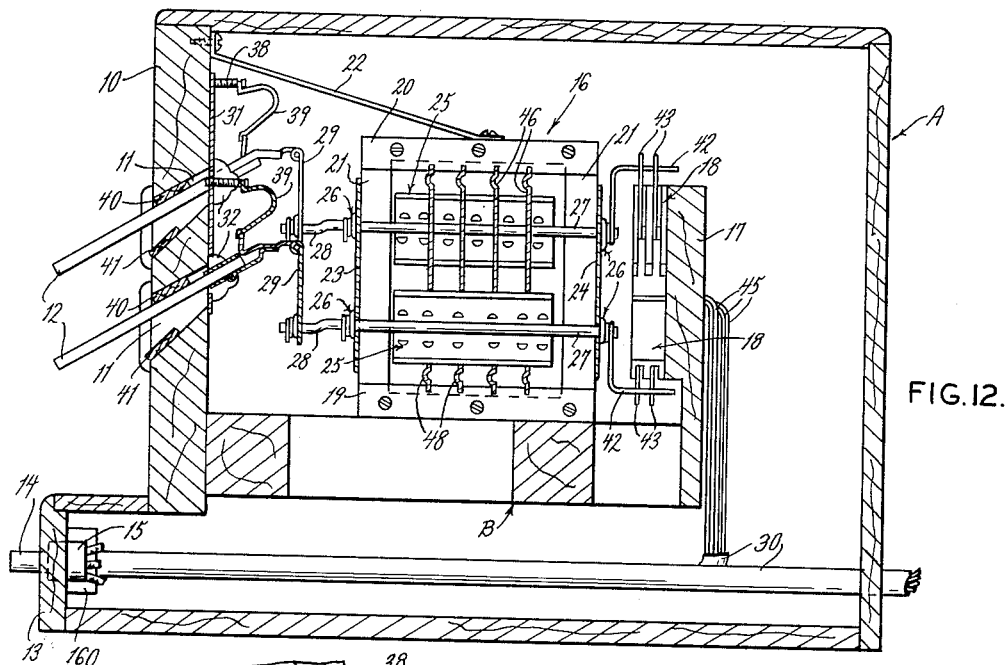

Nov 24, 1953  E. R. KILGEN  2,660,628
MASTER OR CENTRAL STATION CONTROLLER
Original Filed April 9, 1951  5 Sheets-Sheet 5
FIG. 18.
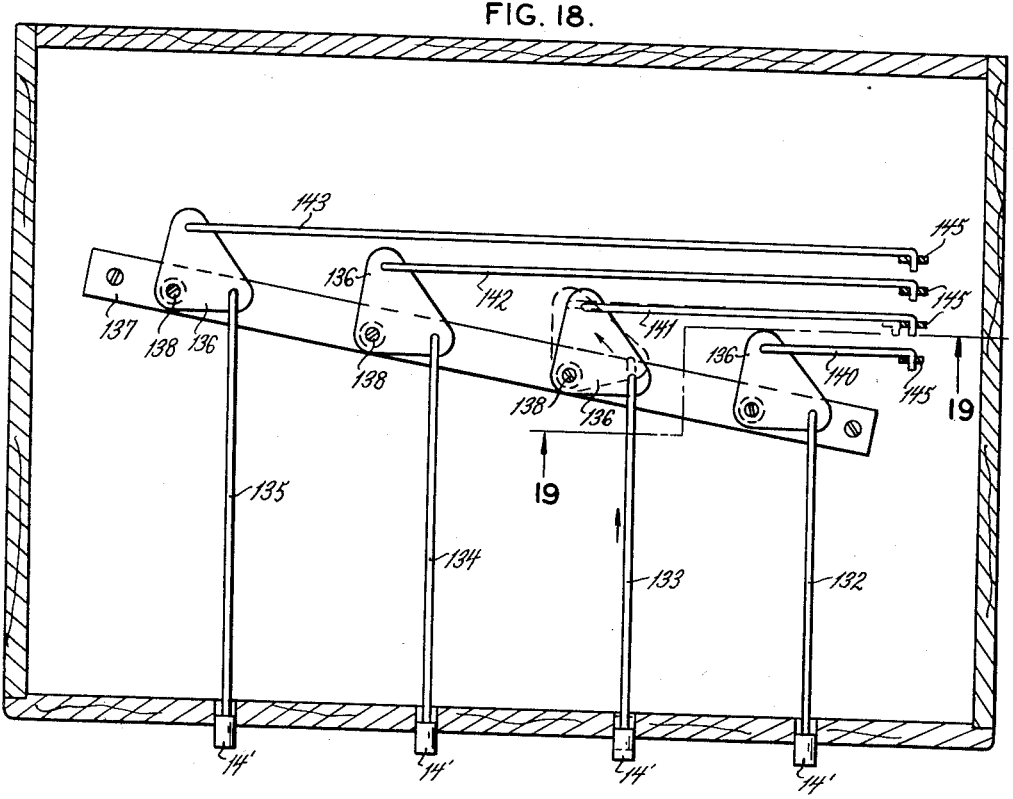
FIG. 17.
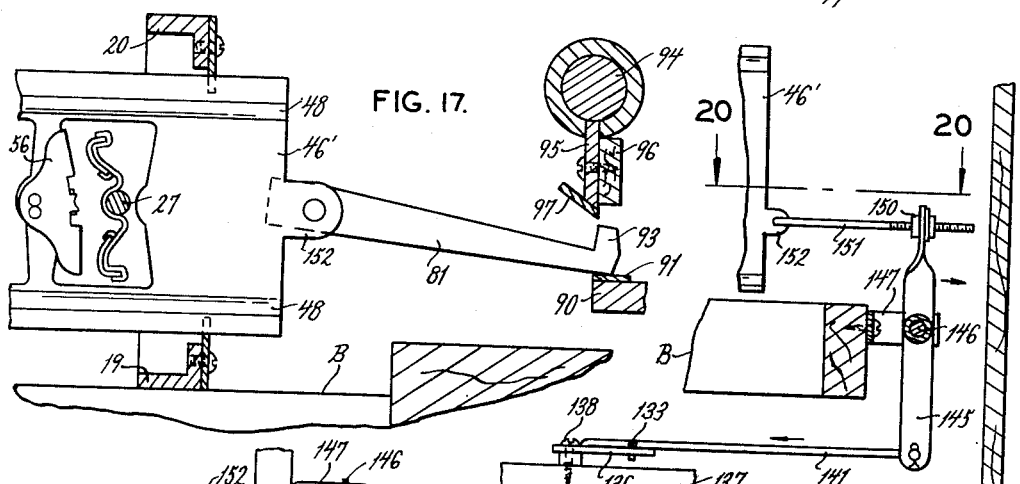
FIG. 19.
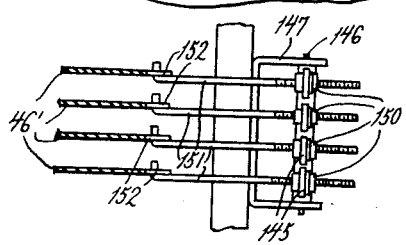
FIG. 20.
INVENTOR.
EUGENE R. KILGEN
BY
*Gravely Lieder Woodruff & Dean*
ATTORNEYS Patented Nov. 24, 1953

2,660,628

UNITED STATES PATENT OFFICE 2,660,628

MASTER OR CENTRAL STATION CONTROLLER

Eugene R. Kilgen, University City, Mo.

Original application April 9, 1951, Serial No. 219,947, now Patent No. 2,595,083, dated April 29, 1952. Divided and this application March 24, 1952, Serial No. 278,269

20 Claims. (Cl. 200—18)

1

This invention relates to improvements in master or central station controllers for simplifying the individual or combination control over a plurality of remote station devices, mechanisms or the like, and is a division of the earlier filed application for patent of Eugene R. Kilgen, Serial No. 219,947, filed April 9, 1951, directed to the switching system, and now Patent No. 2,595,083, dated April 29, 1952.

This invention is directed to switching means and has as an object the provision of a master or central selective station controller which shall be useful for the control of communication systems, calculating machines, railway signal and switching controls, airport lighting and traffic control, control of the operation of aircraft and ships, fuel control on aircraft, fire protection control, gunnery control, control of aerial photography, and many other and similar devices, mechanisms and the like which may be controlled remotely.

It is an object to provide a master controller with a plurality of control means for remotely controllable devices, individual manual control actuating means and a plurality of memory devices or means which may be impressed with a predetermined control function, sequence or combination through the cooperation of the manual means whereby to control the remote devices in any combination of groups, in any sequence of group combinations in a common series or in different series, and in any other combination, sequence, or variation thereof, all with a view to obtaining in a simple, compact central location the maximum number of individual, combination and group controls for remotely located devices.

It is also an object of the present invention to provide a series of individual remote station control members and a series of combination control members, whereby the remote stations may be separately controlled, a selected number or class of remote stations may be combined under one control, or a series of different combinations of remote stations may be established.

It is a further object hereof to simplify the arrangement of remote station and station combination controls in or on a master controller to the end that the several remote stations may have individual control members by which they may be indicated or recognized, and the combination of remote stations may be controlled by a separate series of control members so interrelated with the individual control members as to

2 make use of the latter to indicate or show the combinations as they are selected.

It is also an object of the invention to provide a master controller having a compact arrangement of moving or working parts which permits the accumulation of a large number of control combinations in a small housing so that all thereof may be advantageously mounted to isolate them from external vibration effects and to prevent the transmission of noise which may occur during operation of the controller.

The invention consists in the provision of a plurality of remote circuit selecting means independently operable, a plurality of master control means for combining the independent operation of the individual remote circuit selecting means, and a series of memory devices on each master controller adapted to maintain a preselected position by which the individual selecting means may be caused to operate in the combinations as desired.

The invention further consists in the arrangement of a plurality of rockable members each having a circuit control switch and a manual actuator whose movement serves to indicate the on and off positions of the control switch, and a plurality of reciprocable members each having an element associated with each of the rockable members and an electromagnetic or electromechanical operating device for causing reciprocation of its associated reciprocable member, thereby determining a predetermined combination operation of the rockable members and the control switches responsive thereto.

This invention further consists in the improved parts and combinations and arrangements of parts as will be hereinafter more specifically pointed out and described in connection with the drawings, wherein:

Fig. 3 is an enlarged fragmentary sectional elevation showing details of the construction taken along the staggered section line 3—3 of Fig. 2;

Fig. 4 is a fragmentary sectional plan view at line 4—4 of Fig. 3;

Fig. 5 is a fragmentary elevational view showing a rockable member in sectional elevation in association with a memory element carried by a reciprocable member;

Fig. 6 is a view similar to that of Fig. 5 illustrating a different position of the rockable member and memory element;

Fig. 7 is an enlarged fragmentary elevation of a rockable member of the assembly;

Fig. 8 is a greatly enlarged, partly sectioned, elevational view of an electromagnetic means for actuating the reciprocable member, the view being taken at line 8—8 of Fig. 2;

Fig. 9 is an enlarged elevational view of an electromagnetic motor means seen at line 9—9 of Fig. 2;

Fig. 12 is an enlarged transverse sectional elevational view taken at line 12—12 of Fig. 1;

Fig. 13 is a greatly enlarged fragmentary sectional elevational view of an actuator assembly associated with the rockable members;

Fig. 14 is a view, in section of a rockable member modified over that shown in connection with Fig. 10;

Fig. 15 is an enlarged, fragmentary elevational view of a bearing assembly for the shafts of the rockable members;

Fig. 16 is a sectional view of the bearing assembly taken at line 16—16 in Fig. 15;

Fig. 17 is a fragmentary elevational view of a reciprocable member modified to provide for a single series of memory elements and a single series of rockable members;

Fig. 18 is a fragmentary plan view of a modified mechanical arrangement for actuating the reciprocable members of either Fig. 8 or 17;

Fig. 19 is a fragmentary elevational view at line 19—19 of Fig. 18; and

Fig. 20 is a fragmentary plan view of the mechanism shown along line 20—20 of Fig. 19.

Figure 1:
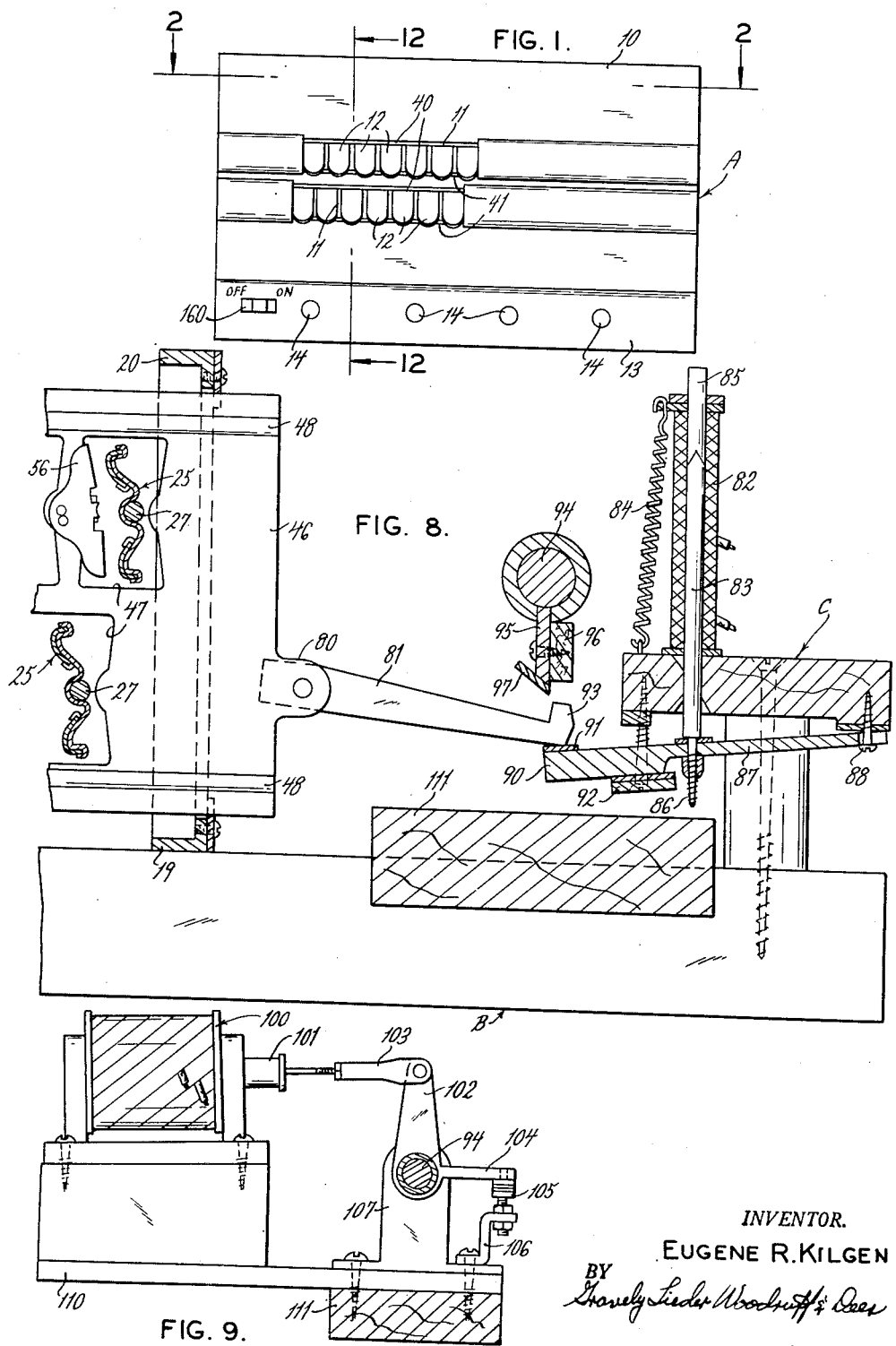
Fig. 1 is a front elevation view of a master controller assembly.

A presently preferred form of the invention has been disclosed in connection with Figs. 1, 2 and 3 of the drawings, and particular reference will be made to these views for an understanding of the construction and principles of operation embodied in the improved master controller. The improved master controller may be conveniently assembled in a housing A having a front panel 10 provided with one or more longitudinal openings 11 through which extend the pivoted elements or tablets 12 for actuating mechanism hereinafter to be described. Two openings or slots 11 and two rows of actuating tablets 12 have been disclosed in connection with Fig. 1, although it is within the scope of this invention to have one, two or more. Below the panel 10 of housing A there is provided a lower panel section 13 on which are mounted a plurality of button or plunger actuating elements 14 for switches 15. Switches 15 are adapted to control electromagnetic devices or electromechanical means, all of which will be more fully explained hereinafter.

Figures 2, 10, 11:
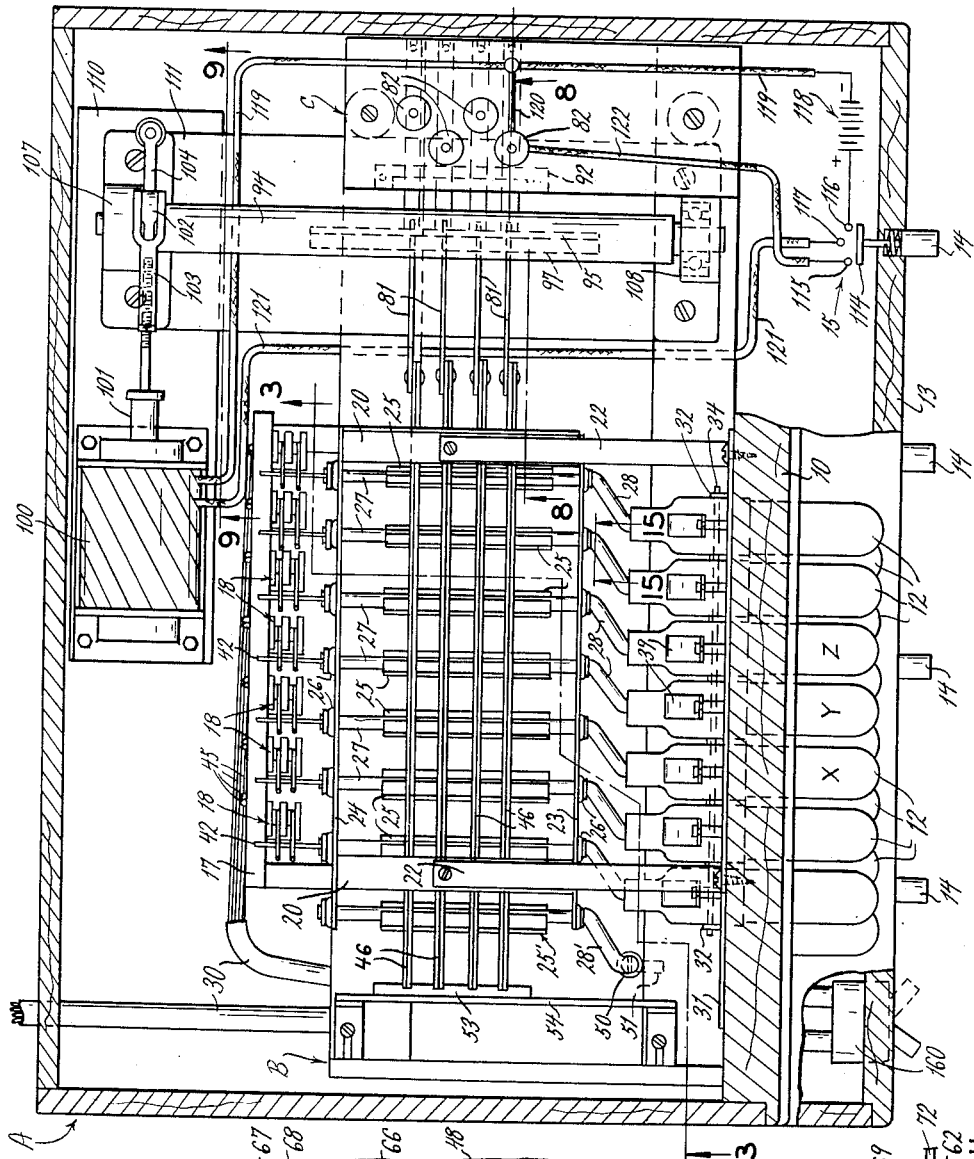
Fig. 2 is an enlarged top plan view, partly in section, of the master controller assembly as viewed along the line 2—2 of Fig. 1.
Fig. 10 is a greatly enlarged and partly sectioned view of the reciprocable member illustrating certain of the details of form and assembly of the movable memory element thereon.
Fig. 11 is a sectional detail view at line 11—11 of Fig. 10.

Referring now to Figs. 2, 3 and 12, the housing A is provided with a base B carried at the lower inner face of panel 10 and projecting rearwardly into the housing above the bottom panel for supporting the circuit controlling assembly 16. At the rear margin of base B there is provided a supporting bracket 17 which is adapted to carry a series or bank of switch elements 18, each switch element being adapted for control association and connection with a remotely located device, mechanism or the like, which it is desired to control from the location of the master control.

The control assembly is operatively mounted in a suitable frame structure mounted on base B and having spaced lower support members 19, corresponding upper support members 20, vertical posts 21, and frame brace straps 22 which are connected to the horizontally directed upper support members 20 and to the rear face of the panel 10 (Fig. 12). This control assembly frame is provided with a front wall 23 and a rear wall 24, the walls being in spaced vertical relation to support therebetween a series of remote circuit selecting means or rockably mounted members 25.

In the view of Figs. 3, 8 and 12, it will be observed that an upper and a lower series of circuit selecting means or rockable members 25 has been provided, though one or more than two such series may be employed. Each of the rockable members is mounted for angular movement in bearing assemblies 26, by which the horizontally directed shaft 27 of each of the members 25 is supported. The forward end portion of each shaft 27 is angularly bent or offset to form a crank portion 28 which, in turn, is operatively connected by means of a relatively stiff strap element 29 with a corresponding one of the tablets 12. It will be observed in Figs. 2 and 12 that there is provided an upper and a lower bank or series of tablets 12 which correspond with the upper and lower series of rockable members 25 respectively. In order to fit all of the rockable members and the cranks 28 therefor into the space, it has been found convenient to stagger the upper and lower series of rockable members and, as a consequence, the tablets 12 are also staggered in like order.

In Fig. 13, there has been disclosed in detail the means for operably mounting a tablet 12 which may be taken as typical of the construction for each of the tablets in each of the series or rows thereof. At the rear face of panel 10 there is mounted a plate 31 provided with a plurality of ears 32, adjacent ones of which pivotally support a head element 33 by means of a pivot pin or shaft 34 having bearing engagement in and between the adjacent ears 32. Each tablet 12 projects forwardly of the front face of panel 10 through the previously mentioned slot 11 and is secured in a head element 33. The tablet is movable within the limits of slot 11 to cause movement of the head about the axis of the pivot pin 34. Head element 33 is formed with a rearwardly projecting arm 35 on which is fixedly mounted a finger 36, one end of the finger 36 being connected to the vertically directed strap 29, and the opposite end being formed to project upwardly, as at 37.

In cooperation with each of the pivoted head elements and in substantial vertical alignment therewith, there is provided a fixed abutment pin 38 for pivotally anchoring one end of a toggle spring 39. The spring 39 has its fulcrum located in the slotted end of the abutment pin 38, and the body loop of the spring is flexed by movement of the finger 37 into one or the other of two positions having an over center relation with respect to a neutral position which is in the plane parallel to and passing through the axis of pivot pin 34 and containing the fulcrum point at the notched end of the abutment pin 38. With this construction in mind, it will be appreciated that in the full line position of tablet 12 (Fig. 13), the toggle spring 39 will react to maintain the tablet in its up position against the upper buffer pad 40 suitably carried or secured in the slot 11. On the other hand, when tablet 12 is displaced downwardly to its dotted line position, toggle spring 39 will have its lower end engaging finger 37 moved inwardly past the said neutral position so as to react in a direction tending to hold the tablet 12 in its down position against a second buffer pad 41 suitably fixed on the lower face of slot 11.

In connection with the described movement of tablet 12, it will be observed that the rearwardly projecting finger 36 carried by the pivoted head 33 will exert a vertical pull on the strap 29 to cause a vertically directed displacement thereof which, in turn, will raise the crank portion 28 of the rockable members connected thereto. In the views of Figs. 2, 3 and 12, when a vertical displacement of the connecting strap 29 occurs due to downward pivoting movement of a tablet 12, the resulting upward angular displacement of the associated crank portion 28 will cause clockwise rotation or rocking movement of the member 25. Due to the toggle action of the springs 39, each tablet 12 will remain in its moved position, either against the upper buffer 40 or lower buffer 41, when rocked about the pivot pin 34. Tablet movement can be by manual manipulation from the front or by motion of the crank portions 28 as will appear. Since the straps 29 are called upon to transmit motion between members 25 and actuating tablets 12, they are formed of a relatively stiff material so as to resist bending or buckling under normal loads.

Referring again to Figs. 2, 3 and 12 of the drawing, each of the rockable members 25 has its operating shaft 27 extending rearwardly where it is operatively mounted in a bearing assembly 26, similar in form and construction to the bearings for supporting the forward end of this shaft adjacent the crank portion 28. The outer or rearward free end of the shaft 27 carries the contact element 42 of the remote circuit control switch 18, it being observed that the contact element 42 is positioned to engage and bridge the two electrodes 43 of this switch.

Switch 18 consists of a base 44 of suitable electrical insulation material having slots or recesses therein to receive and electrically isolate each of the electrodes 43 and to guide the movement thereof when the outwardly projecting ends are engaged by contact element 42. In the view of Fig. 3, it will be observed that the upper bank or series of switches 18 are similarly angularly turned so that the projecting electrodes 43 overlie the position of the rockable shaft 27 carrying the contact 42 associated with such electrodes. On the other hand, the lower bank or series of switches 18 are placed in a position substantially oppositely directed relative to the upper bank so that the projecting electrodes 43 underlie the movable contact 42 carried by the rockable shaft 27 of the lower series of members 25.

Each switch 18 (Fig. 3) has a pair of terminals 43', each of which is a continuation of the electrodes 43 bridged by movable contact 42. The terminals 43' are connected with circuit lead wires 45 which, in turn, are brought to the switches 18 through openings 17' in the switch bracket 17 from a wire bundle 30. The bundle 30 is made up of the multiplicity of circuit leads coming to the master controller from all of the remotely located devices, mechanisms, etc. (not shown).

The control assembly 16 also includes a plurality of reciprocable members or master control means 46 which are arranged in vertical, spaced relation and at an angle to the position assumed by each of the rockable members 25. In the present assembly, the reciprocable members are angularly arranged for movement in a direction at 90 degrees to the axis of the rockable member shaft 27. Each of the reciprocable members is suitably formed as a flat sheet metal stamping provided with one or more series of openings or apertures 47 (two series being shown in Fig. 3) through which the respective rockable members 25 are arranged to extend. The shape or configuration of the openings 47 thus provided in each of the members 46 may be seen upon inspection of Fig. 3. The several reciprocable members 46 are stiffened by longitudinally directed marginal beads 48 and conveniently supported and guided in the lower support members 19, the support member being formed with a suitable groove to receive the lower longitudinal edge thereof. Similarly, the upper longitudinal edge of each of the members 46 is guided through the provision of a guide groove in the upper support member 20.

All of the reciprocable members 46 are adapted to be maintained in a retracted or inoperative position (to the left in Figs. 2 and 3) by means of a dummy rockable member 25' which has its crank arm 28' connected through a suitable resilient element or spring 50 to an anchor 51 so positioned that the spring maintains a force on the crank portion 28' in a counterclockwise direction, thereby tending to rotate the dummy rockable member 25' in a counterclockwise direction. The dummy rockable member 25' is positioned (Fig. 3) in an opening 47' formed in each of the members 46 at the left hand end thereof and is adapted to engage a flanged edge of such opening. Reference to Fig. 4 will show the flanged edge 52 of this opening 47' to be engaged by the dummy rockable member 25'. Each of the reciprocable members 46 engages a buffer 53 carried by a buffer bracket arm 54, the bracket being located in such position that the members 46 when returned by spring 50 to their inoperative position (Fig. 3) strike the buffer 53 so as to suppress noise and absorb the impact.

Referring now to Figs. 3, 4, 5, 10 and 11, it will be appreciated that the reciprocable member 46 is provided with combined memory and position control tappet means 56 arranged in series corresponding to the openings 47, a tappet being mounted in each of the openings 47 formed therein. Each tappet element 56 is formed of a suitable spring or resilient material, in which a pair of parallel, spaced sides 57 are integrally united by a transverse wall portion, the latter being divided into upper and lower striker faces 59 and 60 respectively. The transverse wall is interrupted at the central zone thereof by spaced slots 61, the slots being located on each side of a central stirrup 62 of arcuate or curved form. The side walls 57 of the tappet 56 are provided with rearwardly extending ear portions 63, each of which is further formed with a pair of outwardly projecting spherically shaped recesses 64 and 65. The recesses 64 in each of the ears 63 are in opposite alignment, as are the recesses 65. The tappet means 56 (Figs. 10 and 11) are operatively mounted in the openings 47 of the reciprocable member 46, each tappet being carried on a web portion 66 between adjacent openings 47. Each web portion 66 is provided with an opening 67 in which is mounted a ball bearing element 68. The location of the ball bearing opening 67 is at the horizontal mid portion of the openings 47 and adjacent one of the vertical margins thereof. In the opposite vertical margin of the same web portion 66 there is formed a laterally directed projection having an edge saddle surface 69 between the spaced nibs 72 and and 73. Tappet means 56 is removably mounted in the opening 47 of member 46 with the side walls 57 thereof located to pass on each side of the web 66 (Fig. 11) so that the oppositely aligned spherical recesses 65 in these walls may be snapped over the ball bearing element 68, simultaneously with the engagement of the stirrup 62 on the saddle 69 between the nibs 72 and 73. Nibs 72 and 73 are, as a consequence, received in the spaced slotted openings 61 and act to retain the stirrup portion 67 on its bearing saddle surface 69. When mounted in this position, each tappet means 56 is frictionally retained in either one of two positions depending upon which of the pairs of recesses 64 or 65 are in engagement with the ball bearing element 68 embraced thereby. The construction and method of mounting means 56 in each of the openings 47 of reciprocable members 46, as disclosed in connection with Figs. 10 and 11, may be taken as typical for all of the means carried by the respective members 46.

In the construction of the present master controller, the rockable members 25 are most easily constructed of sheet metal and are conveniently formed in dies or by other means to provide a central elongated curved channel 74 which is brazed, soldered, or otherwise affixed along the length of the shaft 27. The member 25 also is provided with laterally directed wing portions 75, each carrying a buffer strip 76 of suitable resilient or pliable material. Each strip 76 is held in place on the wing 75 by means of an inner series of projecting tabs 77 and by the outer rolled or bent marginal edge 78. In the several positions shown in Figs. 5, 6 and 10, one or both of the striker faces 59 and 60 of the tappet 56 may have engagement with the buffer strips 76 on the wings 75 of the rockable member 25, whereby contact between hard surfaces is prevented and noise is effectively suppressed.

As heretofore pointed out, the members 46 carrying tappet means 56 are adapted to move in a linear direction, whereas the members 25 which are directed at an angle to the members 46 are caused to rock or rotate about the axis of their respective shafts. Relative movement, therefore, between rockable members 25 and reciprocable members 46 will cause the tappet means 56 to strike or be engaged by the rockable members.

The reciprocating motion of each of the members 46 is obtained, in a preferred form of the present invention, through the provision of electromagnetic means, now to be described. Reference will be had to Figs. 2, 8 and 9 for the details of the electromagnetic means employed for one of the reciprocable members 46, it being understood that similar means is used for all thereof.

The member 46 of Fig. 8 has a projecting lug 80 on which is movably carried a pull arm 81. Axially beyond the movable pull arm 81 of the member 46, there is located a support structure C on which is suitably mounted a small electromagnetic actuator 82 having its magnetic armature 83 movable in a vertical direction. The armature is urged in a downward direction by means of a resilient element or spring 84 having operating engagement with the armature 83 by means 85. The lower projecting end of armature 83 extends through an opening in the support structure C and is provided with a threaded stud 86 adjustably supporting a lever 87, one end of lever 87 being loosely supported in the structure C by element 88 and the opposite end forming a striker head 90 carrying a buffer strip 91. Lever 87 is supported in its inoperative position by means of an adjustable bar 92 which is carried at the underside of the support structure C. In Fig. 8, striker 90 on the lever 87 is shown in its inoperative position with the corresponding pull arm 81 resting on the buffer strip 91 of the striker. The outer end of arm 81 is provided with an upwardly directed hook portion 93 which is located below a rotatable shaft 94 carrying thereon a depending fin member 95 which extends along the shaft 94 above the location of all of the pull arms 81, and more particularly above the hooked portions 93 thereof. The fin 95 carries a suitable buffer strip 96. Actuation of the armature 83 of the electromagnetic device 82 elevates the striker 90 on lever 87, thereby bringing the hook portion 93 of the associated arm 81 into engagement with the depending fin 95 on shaft 94. This armature actuation thereby effects an operating engagement between the reciprocable member 46 and the operating shaft 94. In the view of Fig. 8, counterclockwise rotation of operating shaft 94 is required to slide or move the member 46 in the direction to cause the sensing means or tappets 56 to approach and engage selected ones of the rockable members 25.

Rotational operation of shaft 94 may be conveniently obtained through the provision of an electromagnetic motor means 100 (Figs. 2 and 9) arranged with its armature 101 connected to a crank arm 102 by means of a clevis connector 103. The operating crank 102 for shaft 94 is provided with a laterally projecting arm 104 adapted to engage an adjustable stop element 105 carried by bracket 106. The operating shaft 94 is conveniently rotationally supported in a bearing bracket 107 located adjacent the electromagnetic motor means 100 and in a second similar bearing 108 (Fig. 2) supporting the opposite end of said shaft. Motor means 100 and bearing 107 are carried on a platform 110 supported by an auxiliary base block 111 secured to one end of the base B on which the control assembly 10 is mounted. It has been previously pointed out that the operating mechanism shown and described in connection with Fig. 8 may be taken as typical of the operating means associated with each of the reciprocable members 46. On the other hand, the electromagnetic motor means 100 is adapted to operate any of the reciprocable members 46 having its hooked pull arm 81 in engagement with the depending fin 95 on shaft 94.

A guard plate 97 is attached to the fin 95 to prevent the other pull arms 81 being actuated by the other electromagnetic means 82 to raised position where the hooked portion 93 may move behind the fin 95 and prevent its return to release the selected one of the arms 81.

Referring now particularly to Fig. 2, the right hand one of the button elements 14 for the switch means 15 has been shown in detail with respect to a typical electrical circuit system associated with the electromagnetic actuator means 82 and the electromagnetic motor means 100. Each of the switches 15 under control of the switch button 14 is adapted to control a similar electrical circuit, but only one typical circuit has been disclosed in Fig. 2, in order to avoid confusion in the drawings. Switch means 15 comprises a bridge element 114 and three switch contacts 115, 116, and 117. Contact 116 is connected to a source of electrical energy such as the battery 118, however it is understood that the current source may be alternating current. From battery 118, a lead 119 extends into connection with the motor means 100, a branch lead 120 being taken from lead 119 for connection with the electromagnetic actuator 82 disclosed in connection with Fig. 8. The opposite side of the circuit for motor means 100 is made by the lead 121 connected with switch contact 117. The opposite side of the circuit for the electromagnetic actuator 82 is made by lead 122 with the switch contact 115.

When switch button 14 is depressed its bridge element 114 first electrically connects switch contacts 115 and 116, thereby closing the battery circuit through the switch and the electromagnetic actuator 82 and causing the elevation of the pivoted pull arm 81 to bring its hooked end 93 into engagement with the fin 95 on shaft 94. Continued inward movement of button 14 causes its bridge element 114 to engage contact 117, thereby closing the battery circuit through leads 119 and 121 with the motor means 100. Energization of motor means 100 results in rocking displacement of the shaft 94 and reciprocation of the engaged member 46 without necessitating movement of any of the others thereof. Release of the switch button 14 breaks each of the above described circuits to the electromagnetic means 82 and motor means 100, thereby permitting the pull arm 81 to drop free of the fin 95, at which time return spring 59 (Fig. 3) causes the dummy rockable member 25' to restore that one of the members 46 which has been reciprocated to its inoperative position.

The operation of the master controller which forms the preferred embodiment of the invention will now be described in connection with Figs. 2 and 3. It will first be assumed that each of the tablets 12 has been moved to its upper position which corresponds with the open or circuit break position of the associated switch means 18, and that each of the switch buttons 14 is in its outward, off position. Now let it be assumed that it is desired to individually, manually control remotely located devices X, Y, and Z (not shown) corresponding to the tablets 12 marked X, Y and Z. Obviously one, or any group or series of these tablets 12 may be individually actuated, as desired. To accomplish individual or separate control, the operator at the master controller simply depresses the individual tablets 12X, 12Y or 12Z to move them to their circuit make position. Rockable members 25 for each of these tablets are rotated, thus causing the respective switch arm contacts 42 to bridge the pairs of electrodes 43. Since each tablet 12 has a toggle spring 39, the switches 18 affected by tablets 12X, 12Y or 12Z will remain in circuit make or on position until the tablet is manually elevated or moved to off or break position.

Now if it is desired to group the remote devices (not shown) for simultaneous and repeated operation, the operator must first push in on the appropriate switch button 14. Actuation of the switch 15 associated with the button 14 thus selected, will shift or reciprocate the associated reciprocable member 46 by its arm 81 and electromagnetic means 82 and motor means 100. Holding button 14 depressed, maintains the member 46 in operative position (Fig. 5) relative to the inoperative position of the rockable members 25. It may also be assumed that the tappet means 56 on the operated one of the members 46 are in inoperative or off positions, such as is shown in Fig. 5, and that they are frictionally retained by reason of the pair of spherical recesses 64 engaging the ball bearing element 68 (Fig. 11). Now in order to set up the simultaneous or repeat control of the desired remote devices (not shown), the operator must depress the tablets 12X, 12Y and 12Z, thereby rocking the associated members 25 to their operative positions illustrated in Fig. 6, for purposes of example. This displacement of members 25 shifts the position of the tappets 56 so that the tappet is frictionally held in its new or on position by reason of the spherical recesses 65 engaging the ball element 68. It will be remembered that depression or downward movement of the tablets 12 shifts the active position of the toggle spring means 39 to retain the tablets in such moved position. As a consequence, the associated switch means 18 is retained closed, completing a control circuit through such switch to the associated remotely located mechanism or device (not shown) which is connected thereto. If the operator now releases switch button 14, thereby breaking the respective circuits to the electromagnetic actuator 82 and motor means 100 it will be appreciated that the reciprocable member 46 will be returned to its inoperative position by action of spring means 59 through the dummy rockable member 25'. The tablets 12X, 12Y and 12Z will, however, remain depressed until they are manually moved to their off or up positions, thereby opening the respective switch means 18 and decontrolling the remotely located devices.

If, at a later time, it should be desired to reestablish control over these remotely located devices, the operator at the master controller is required only to push the switch button 14 so designated, causing movement of the same reciprocable member 46 to its operative position, and by which movement the memory means or tappets 56, previously set up, will forcibly and automatically rock members 25 to the on position for closing the switches 18 associated therewith. This function of the tappets is the equivalent of providing the controller with a capacity to remember a given group or combination or unit control plan. It may be visually followed by observing the movement of the tablets 12X, 12Y and 12Z, corresponding to the example given.

The value of the tappet means 56 resides in their function to remain in a given position unless acted upon by a superior external force. The external force required can come only from the rockable members 25 when the latter are moved by manual manipulation of the connected tablets 12. If the tablet 12 is not manually held or moved, the connected rockable member 25 is relatively free and can be moved by the memory tappet means 56 when the reciprocable member 46 is displaced. For example, in Fig. 5, the angular position of the member 25 corresponds with its inoperative position in which its switch means 18 is open, and the tappet means 56 is in a like position. The member 25 and tappet means 56 are adjacent by reason of the reciprocable member 46 having been moved to the right relative to the position of shaft 27 for member 25.

Now consider the positions assumed by the parts disclosed in Fig. 6. The reciprocable member 46 is shown in its operative position or moved to the right and the rockable member 25 is shown in its circuit make position. The effect of these combined movements of members 46 and 25 is to produce a shift in the angular position of the tappet 56 from the inoperative position of Fig. 5, whereby the means 56 has the paired spherical recesses 65 in position embracing the ball bearing 68 carried in the web 66 of member 46. Should the reciprocable member 46 be now moved to the left relative to the shaft 27, the tappet 56 will remain in the shifted position and will move away from the rockable member 25, thereby leaving sufficient space in which the member 25 may be moved to its inoperative position, so that the parts have positions as shown in Fig. 10.

Accordingly, the reciprocation of any one of the members 46 will cause the means 56 carried thereby to assume positions within the path of motion of the rockable members 25. If all of the rockable members 25 are in an inoperative position and all of the means 56 are likewise in an inoperative position, motion of any one of the members 46 will not produce displacement of members 25 or tappet elements 56. On the other hand, with a member 46 in its moved position, the elements 56 or any of them on that member may be shifted to operative position by manual manipulation of the desired tablets 12, thereby rockably displacing the connected members 25 to set up any desired one or a combination of the elements 56. Conversely, if the elements 56 carried by the reciprocable member 46 have been set up or impressed with a predetermined desired combination, movement of member 46 will cause the preset elements 56 to strike the desired combination of rockable members 25 and cause them to move into circuit make position closing the respective switches 18 associated therewith.

Referring now to Figs. 15 and 16, there has been shown a novel bearing assembly for supporting each end of the respective shafts 27 carrying the rockable members 25. It is noted that the bearing assembly to be described is typical of each of the bearings required for mounting these shafts 27. The bearing comprises a non metallic annular element 125 which surrounds the shaft 27 and a holder 126 for the non metallic element, which holder surrounds the shaft and supports the element on the frame wall, such as the front wall 23. Holder 126 is provided with a plurality of spaced inturned prongs 127 which engage in suitable slots formed in the front wall 23 about the shaft aperture. Holder 126 supports the non metallic element 125 by means of a plurality of outturned fingers 128. A snap ring retainer 129 is provided to releasably engage recesses in an outer portion of the shaft 127 adjacent element 125. A shaft bearing element of this form is particularly well suited for use in connection with the master controller herein described, as it supports the shaft 27 against vibration effects and reduces friction to a minimum. Furthermore the nature and construction of this bearing facilitates assembly of the shafts 27, and greatly reduces the cost involved.

Fig. 17 discloses a modified form of reciprocable member 46' in which a single series of memory tappets 56 has been mounted. Such modified members 46' are, however, movably controlled by means similar to that disclosed in connection with Fig. 8. Briefly, this mechanism includes the striker 90 effective to elevate pull arm 81 into hooked connection with the depending fin 95 on the operating shaft 94 thereby mechanically connecting the member 46' with the operating shaft 94. Movement of the striker 90 in an upward direction is obtained through the provision of electromagnetic means such as that shown at 82 in Fig. 8.

In Figs. 18 through 20, there is disclosed a modified form of the present invention in which the electromagnetic operating means shown and described in connection with Figs. 8 and 9 has now been replaced by an electromechanical operating mechanism. The previously described push bottoms 14 for electric switches 15 have, in the modified arrangement, been replaced by push buttons 14' directly connected to rearwardly extending push rods. Beginning at the right hand one of the push buttons 14' of Fig. 18, it will be observed that the push rods 132, 133, 134 and 135 progressively increase in length. Each of these push rods is connected to a motion changing pivoted element 136 movably mounted on a suitable support member 137 by means of pivot forming elements 138. The motion changing elements 136 are connected with a second series of variable length push rods 140, 141, 142 and 143, all of the latter push rods extending in a common direction for operative connection with a series of substantially identical pivoted levers 145. A typical one of the levers 145 has been disclosed in Fig. 19, such lever 145 being associated with the push rod 141. Each of the levers 145 is pivoted at element 146 intermediate its ends on a suitable bracket 147 carried adjacent an end face of the base B. The upper ends of each of the pivoted levers 145 have rotatable adjustment elements 150 adapted to receive in threaded engagement the end of a pull arm 151. The pull arms 151 are identical, and each thereof is connected with a lug 152 formed on or carried by the adjacent end of the reciprocable member 46'. The presently modified electromechanical actuating mechanism operates to make or break the control circuit for a remotely located device by the previously described switch means 18. The mechanical portion of this control system is related with the modified reciprocable master control members 46' which in the present disclosure are similar to the modified member 46' shown in Fig. 17. The modified members 46' have a single series of openings, each containing one of the tappet elements 56.

In operation, reciprocating motion of the members 46' may be obtained by manually depressing a selected one of the buttons 14', causing pivoting displacement of the motion changing member 136 and consequent longitudinal displacement of the connected push rod 141. In the view of Fig. 18, this control function has been shown in connection with displacement of push rods 133 and 141 to cause pivoting movement of the vertically directed lever 145 and displacement of the member 46' connected to the lever 145 by means of the pull arm 151. The means by which each of the members 46' is returned to its inoperative position has not been shown here, as it is similar to that shown in connection with Fig. 3 at 25', 28' and 50. It should be clear how this spring operated return mechanism may be applied to the modified reciprocable members 46'.

Fig. 14 discloses a modified construction which may be employed for each of the rockable members 25 of Fig. 10. The modified rockable member 155 is formed with a central longitudinally directed channel 156 having oppositely directed curved wings 157 and a rolled edge 158, imparting longitudinal stiffness to the member. The modified rockable member may be employed in master controller assemblies where it is not particularly necessary to suppress or deaden noise. Therefore, it is noted that the modified rockable member 155 has not been made for securing a noise suppresser strip on the wing portions 157, such as has been included in connection with the rockable members 25. In constructing a rockable member of the modified type of Fig. 14, the curving configuration of each wing portion 157 must be given an increased depth to make it conform to the effective curvature of the buffer strip 76 carried by the preferred form of rockable member 25, so that the same physical relationship may be preserved with the elements 56. Constructing the modified rockable members 155 in this manner will permit complete and full interchangeability with the first described rockable members 25.

The master controller is connected with the remotely located devices, mechanisms, etc. (not shown) by the pairs of leads in the wire bundle or cable 30, Figs. 2 and 12. A suitable master "on-off" switch 160 is connected into this cable to permit the controller to be operated into its several control combinations, as desired, without actually affecting the devices controlled during the set up operation. A single switch 160 has been shown, but more switches may be employed as occasions demand.

Some materials for construction have been suggested herein, but the invention is not to be limited in this respect as the use or application hereof will to a large extent determine the materials actually used. Suffice it to state that metal, wood or a combination may be used and that certain plastic materials and plastic treated or impregnated materials may also be found suitable, depending upon costs involved, the service requirements and whether or not it should be fire resistant or protected for shock and vibration effects.

Commercial applications of the present master controller are many and varied, including therein a complete signal and switch control system for a railway yard and station layout, operation of the many instruments and recording devices found in connection with wind tunnels, and control over the operation of a ship. It may be mentioned also that the present invention has utility in connection with the operation of the large airplanes, both commercial and military. For example, the control of aircraft engine starting and flight operation, the selection or switching of fuel tanks, the detection of fire and operation of fire protection systems, cabin pressure and ventilation, and many other functions can be controlled from the present controller by arranging the several control functions in groups which can be pre-selected before the aircraft leaves the ground. The concept of master controls may be adapted for operating a warship, and for the control of aerial photography from a master control to individual cameras in several airplanes.

It is also within the present invention to employ any reasonable range of electrical current or voltage, whether direct or alterating, and that a rectifier or transformer may be added to adjust the current to suit conditions.

The present invention has been described in connection with a preferred embodiment and in the light of certain modifications thereof, but it should be clearly understood that further and additional modifications in the construction of the several parts and in their arrangements in the assembly may come within the scope of the claims hereinafter appearing.

What is claim is:

1. In a master controller for remotely located means to be controlled through circuit connections to the controller, the combination of circuit selecting means movable between circuit make and break positions, control means movable adjacent said selecting means between operative and inoperative positions to control the remotely located means, and tappet means mounted on said control means for movement between on and off positions corresponding with the respective make and break positions of said selecting means, said tappet means being adjacent said selecting means in the operative position of said control means for influencing the position of said selecting means and being removed from influence over said selecting means in the inoperative position of said control means.

2. A master controller as set forth in claim 1, wherein said circuit selecting means is angularly movable between its said positions, and said tappet means is mounted for angular shifting movement between its said positions.

3. A master controller as set forth in claim 1, wherein said control means is movable in a linear path, and means is connected with said control means yieldingly to retain the latter in said inoperative position.

4. A master controller as set forth in claim 1, wherein said control means is movable relative to said selecting means in a linear path, electromagnetic means is connected with said control means for moving the latter in said linear path into operative position, and means is connected with said control means yieldingly to retain the latter in said inoperative position.

5. A master controller as set forth in claim 1, wherein said control means is manually movable into said operative position, and resilient means is connected with said control means for urging the latter into said inoperative position.

6. A master controller as set forth in claim 1, wherein said control means is apertured to receive said circuit selecting means therein, and said tappet means is mounted in said apertured control means adjacent said selecting means.

7. In a master controller for remotely located devices having control circuit connections with the master controller, the combination of circuit selecting members for each of the devices to be controlled, said selecting members each being movable between circuit make and break positions, a plurality of control members disposed adjacent said selecting members and movable between operative and inoperative positions, and tappet means carried by said control members adjacent said selecting means, said tappet means being selectively movable into and out of positions for determining the movement of said circuit selecting members in predetermined combinations corresponding with the operative positition of said control members.

8. A master controller as set forth in claim 7, wherein each of said circuit selecting members is rockably movable between said make and break positions, and said tappet means are carried by said control members for angular shifting movement into and out positions for determining the movement of said circuit selecting members.

9. A master controller as set forth in claim 7, wherein said control members are movable in a linear path across the positions occupied by said circuit selecting members, and means is provided yieldingly to retain said control members in said inoperative positions.

10. A master controller as set forth in claim 7, wherein each of said control members carries tappet means for each of said circuit selecting members, and means is carried by said control members to be engaged by said tappet means individually for temporarily holding said tappet means in said selected positions of movement.

11. A master controller as set forth in claim 7, wherein electromagnetic motor means is provided for moving said control members, and separate actuator means connects each of said control members with said motor means for individual movement thereof.

12. A master controller as set forth in claim 7, wherein separate manually operable means is provided for moving said plurality of control members into said operative position, and resilient means is provided common to said plurality of control members for yieldingly retaining the latter in said inoperative position.

13. In a controller, a frame structure, a plurality of rockable members bearinged in said frame, means connected with each rockable member for moving the same and indicating the position assumed by such movement, a series of control members carried by said frame and movable relatively across the path of movement of said rockable members, means for moving each of said control members between operative and inoperative positions relative to said rockable members, tappet elements carried by each of said control members for each of said rockable members, said tappets being rockable between positions influencing said rockable members and removed therefrom, and separate friction elements carried in said control members to be embraced by said tappet elements for resisting rockable displacement of the tappets.

14. The controller as set forth in claim 13, wherein said means for moving said control members comprises electromagnetic motor means for moving said members and electromagnetic actuator means individual to said members for interconnecting a selected control member with said electromagnetic motor means.

15. The controller as set forth in claim 13, wherein the moving means for said control members includes a manual element for each said control member, and a series of levers connected between each of said manual elements and the control member therefor.

16. In a controller, the combination of a control member movable between operative and inoperative positions, tappet means movably carried by said control member and having preselected angular positions, rockable means adjacent said control member movable responsively to said tappet means to assume the angular position of the latter, said rockable means and tappet means coming into contact upon movement of said control member into operative position, and noise suppressing means carried by one of said means.

17. The combination set forth in claim 16, wherein said rockable means is formed with oppositely extending wings arranged selectively to contact with said tappet element, and said noise suppressing means is carried on said wings.

18. In a controller, the combination of a reciprocating member havinbg an opening therein, a rockable member extending through said opening, a tappet rockably bearinged on said reciprocating member at one margin of said opening, said tappet having spaced side portions embracing said reciprocating member and formed with spaced recesses in each side portion, a ball element carried in said reciprocating member in position to have different ones of said tappet side recesses snap into engagement with the ball element in different positions of said tappet, said tappet being retained in different positions for influencing the movement of said rockable member upon movement of said reciprocating member, and control means connected with said rockable member.

19. In a controller for remotely located means to be controlled in selected groups through circuit connections established at the controller: the combination of individual switching means connected to the remotely located means, individual circuit selecting means for each of said switching means reversibly movable to open and close said switching means, a plurality of control members movable between circuit establishing positions and circuit open positions, said control members being located adjacent all of said circuit selecting means, tappet means carried on each of said control members adjacent each of said circuit selecting means, each said tappet means being selectively movable into and out of a position for influencing the position of said adjacent circuit selecting means in the circuit establishing position of said control member on which it is carried, and manually operated means operatively connected to each of said control members to move the control members individually to select a group of switching means established by selected ones of said tappet means being in said positions for influencing the position of said adjacent circuit selecting means.

20. In a controller for remotely located means to be controlled individually or in selected groups through circuit connections established at the controller: the combination of a plurality of individual switch means connected to the remotely located means to be controlled, said switch means having circuit make and break positions, a movable circuit selecting member connected to each switch means, manually movable means connected to each circuit selecting member for moving the latter member selectively into positions for determining the make and break positions of the connected switch means, and group control means adjacent all of said circuit selecting members, said group control means including a slide member movable between operative and inoperative positions and selectively movable tappets on said slide member adjacent each circuit selecting member, said tappets having a first position for influencing the group movement of adjacent circuit selecting members to make circuits at the connected switch means for the operative position of said slide member, and said tappets having a second position out of group movement influencing relation to said circuit selecting member for either position of said slide member.

EUGENE R. KILGEN.

References Cited in the file of this patent

UNITED STATES PATENTS

| Number | Name | Date |
|---|---|---|
| 2,484,725 | Parker | Oct. 11, 1949 |